United States Patent
Ray, II

(10) Patent No.: US 12,502,370 B2
(45) Date of Patent: Dec. 23, 2025

(54) WOUND TREATMENTS AND COMPOSITIONS

(71) Applicant: CMPD Licensing, LLC, Conroe, TX (US)

(72) Inventor: Jay Richard Ray, II, Conroe, TX (US)

(73) Assignee: CMPD Licensing, LLC, Conroe, TX (US)

( * ) Notice: Subject to any disclaimer, the term of this patent is extended or adjusted under 35 U.S.C. 154(b) by 147 days.

(21) Appl. No.: 16/381,975

(22) Filed: Apr. 11, 2019

(65) Prior Publication Data

US 2020/0323808 A1 Oct. 15, 2020

(51) Int. Cl.
| | | |
|---|---|---|
| *A61K 31/22* | (2006.01) | |
| *A61K 9/00* | (2006.01) | |
| *A61K 9/06* | (2006.01) | |
| *A61K 9/14* | (2006.01) | |
| *A61K 31/47* | (2006.01) | |
| *A61P 17/02* | (2006.01) | |
| *A61P 31/04* | (2006.01) | |

(52) U.S. Cl.
CPC ............ *A61K 31/22* (2013.01); *A61K 9/0014* (2013.01); *A61K 9/06* (2013.01); *A61K 9/14* (2013.01); *A61K 31/47* (2013.01); *A61P 17/02* (2018.01); *A61P 31/04* (2018.01)

(58) Field of Classification Search
CPC ................................ A61P 31/04; A61P 17/02
See application file for complete search history.

(56) References Cited

U.S. PATENT DOCUMENTS

| | | | | |
|---|---|---|---|---|
| 7,517,852 | B2 * | 4/2009 | Walsh | A61K 31/7036 514/1.1 |
| 2004/0087630 | A1 * | 5/2004 | Allison | A61P 9/10 514/342 |
| 2011/0052704 | A1 * | 3/2011 | Nazzal | A61K 9/1075 514/277 |
| 2011/0105996 | A1 * | 5/2011 | Mustoe | A61K 31/704 604/20 |
| 2011/0245786 | A1 * | 10/2011 | Hulse | A61M 3/0262 604/311 |
| 2017/0096418 | A1 * | 4/2017 | Patron | A61K 9/0014 |
| 2020/0113899 | A1 * | 4/2020 | Chase | A61P 25/28 |

* cited by examiner

*Primary Examiner* — Renee Claytor
*Assistant Examiner* — Andrew P Lee
(74) *Attorney, Agent, or Firm* — Akerman LLP

(57) ABSTRACT

A method of treating a wound may include topically administering a statin composition including a statin selected from atorvastatin, fluvastatin, lovastatin, pitavastatin, pravastatin, rosuvastatin, simvastatin, or combination thereof. The statin composition may be administered in an ointment, powder, or liquid format. The method may also include topically administering one or more antimicrobial drugs.

1 Claim, No Drawings

WOUND TREATMENTS AND COMPOSITIONS

TECHNICAL FIELD

The present application relates to compounded wound treatments and methods of treating wounds. More specifically, the present application relates to topical compounded wound treatments including one or more statins and methods of topically treating wounds with the same.

BACKGROUND

Wound healing is a complex and dynamic process in which tissues repair from damage. The process generally includes a hemostasis phase, an inflammation phase, a granulation tissue formation phase, and a tissue remodeling phase. Wounds may occur from broken or unbroken skin as a result of blunt trauma, punctures, excessive exposure to cold or heat, chemical exposure, radiation exposure, and surgical procedures. Wounds may also arise as itching, scaling, swelling, or blistering of the skin. Wounds may also arise from eczemas, chronic skin conditions such as psoriasis, rosacea, and conditions accompanying bacterial, viral, or fungal infections may also damage skin.

Many factors can complicate or interfere with normal adequate wound healing. For example, such factors include age, infection, poor nutrition, immunosuppression, medications, radiation, diabetes, peripheral vascular disease, systemic illness, smoking, or stress. Abnormal wound healing can increase susceptibility to local infection, which also increases the risk systemic infection. What is needed are additional and alternative wound healing compositions for the treatment of wounds.

SUMMARY

In one aspect, a method of making a statin composition for topical administration to treat a wound includes combining: a statin selected from atorvastatin, fluvastatin, lovastatin, pitavastatin, pravastatin, rosuvastatin, simvastatin, or combination thereof, one or more antimicrobial drugs, and a base component comprising an ointment carrier, powder carrier, or liquid carrier.

When selected, the atorvastatin may be combined in an amount between about 10 mg and about 80 mg per dose volume of the statin composition, the fluvastatin may be combined in an amount between about 20 mg and about 80 mg per dose volume of the statin composition, the lovastatin may combined in an amount between about 10 and about 60 mg per dose volume of the statin composition, the pitavastatin may be combined in an amount between about 1 mg and about 4 mg per dose volume of the statin composition, the pravastatin may be combined in an amount between about 10 mg and about 80 mg per dose volume of the statin composition, the rosuvastatin may be combined in an amount between about 5 mg and about 40 mg per dose volume of the statin composition, and the simvastatin may be combined in an amount between about 5 mg and about 80 mg of the statin composition.

In one example, the statin comprises ground oral tablets of the selected statin. In a further or another example, the antimicrobial drugs comprise at least an antifungal drug, an antibacterial drug, or both. In an above or another example, combining the statin includes combining a powder content of a capsule, wherein the powder content includes all or a portion of the statin. In an above or another example, the method include further combining xylitol, poloxamers, or both.

In another aspect, a statin composition for topical administration to treat a wound includes a statin selected from atorvastatin, fluvastatin, lovastatin, pitavastatin, pravastatin, rosuvastatin, simvastatin, combination thereof; one or more antimicrobial drugs; and a base component comprising an ointment carrier, powder carrier, or liquid carrier.

When selected, the atorvastatin may be combined in an amount between about 10 mg and about 80 mg per dose volume of the statin composition, the fluvastatin may be combined in an amount between about 20 mg and about 80 mg per dose volume of the statin composition, the lovastatin may combined in an amount between about 10 and about 60 mg per dose volume of the statin composition, the pitavastatin may be combined in an amount between about 1 mg and about 4 mg per dose volume of the statin composition, the pravastatin may be combined in an amount between about 10 mg and about 80 mg per dose volume of the statin composition, the rosuvastatin may be combined in an amount between about 5 mg and about 40 mg per dose volume of the statin composition, and the simvastatin may be combined in an amount between about 5 mg and about 80 mg of the statin composition.

In one example, the statin composition comprises contents of an oral tablet of a selected statin. In a further or another example, the antimicrobial drugs comprise at least an antifungal drug, an antibacterial drug, or both. In an above or another example, the statin composition includes powdered contents of a capsule, wherein the powdered contents include all or a portion of the statin. In an above or another example, the base component further comprises xylitol, poloxamers, or both.

In yet another aspect, a method of treating a wound includes topically administering to the wound a statin composition comprising a statin selected from atorvastatin, fluvastatin, lovastatin, pitavastatin, pravastatin, rosuvastatin, simvastatin, combination thereof; one or more antimicrobial drugs; and a base component comprising an ointment carrier, powder carrier, or liquid carrier.

When selected, the atorvastatin may be combined in an amount between about 10 mg and about 80 mg per dose volume of the statin composition, the fluvastatin may be combined in an amount between about 20 mg and about 80 mg per dose volume of the statin composition, the lovastatin may combined in an amount between about 10 and about 60 mg per dose volume of the statin composition, the pitavastatin may be combined in an amount between about 1 mg and about 4 mg per dose volume of the statin composition, the pravastatin may be combined in an amount between about 10 mg and about 80 mg per dose volume of the statin composition, the rosuvastatin may be combined in an amount between about 5 mg and about 40 mg per dose volume of the statin composition, and the simvastatin may be combined in an amount between about 5 mg and about 80 mg of the statin composition.

In one example, the statin composition comprises contents of an oral tablet of a selected statin. In a further or another example, the antimicrobial drugs comprise at least an antifungal drug, an antibacterial drug, or both. In an above or another example, the statin composition includes powdered contents of a capsule, wherein the powdered contents include all or a portion of the statin. In an above or another example, the statin composition further comprises xylitol, poloxamers, or both.

In an above or another example, the base component comprises a powder carrier, the statin composition comprises a wound powder, and administering the statin composition comprises topically applying the wound powder to or adjacent to wounded skin or tissue.

In an above or another example, the base component comprises a liquid carrier, the statin composition comprises a wound spray, and administering the statin composition comprises spraying the wound spray onto or adjacent to wounded skin or tissue.

In an above or another example, the base component comprises a liquid carrier, the statin composition comprises a wound irrigation solution, and administering the statin composition comprises irrigating wounded skin or tissue with the wound irrigation solution.

In an above or another example, the base component comprises a liquid carrier, the statin composition comprises a footbath solution, and administering the statin composition comprises submerging wounded skin or tissue in the footbath solution.

In still another aspect, a method of treating a wound includes co-administering to the wound within a 24-hour period a statin component and an antimicrobial component. The co-administering may include topically administering a statin composition and topically administering an antimicrobial composition. The statin composition may include the statin component. The statin component include a statin selected from atorvastatin, fluvastatin, lovastatin, pitavastatin, pravastatin, rosuvastatin, simvastatin, or combination thereof. The statin composition may be administered in an ointment, liquid, or powder format. The antimicrobial component may include one or more antimicrobial drugs.

In various embodiments, atorvastatin may be present in an amount between about 10 mg and about 80 mg; fluvastatin may present in an amount between about 20 mg and about 80 mg; lovastatin may be present in an amount between about 10 and about 60 mg; pitavastatin may be present in an amount between about 1 mg and about 4 mg; pravastatin may be present in an amount between about 10 mg and about 80 mg; rosuvastatin may be present in an amount between about 5 mg and about 40 mg; or the simvastatin may be present in an amount between about 5 mg and about 80 mg.

In one example, the statin composition includes contents of an oral tablet of the selected statin. In the above or another example, the statin composition further comprises xylitol, poloxamers, or both.

In one example, the statin composition may be topically administered to the wound in the liquid format including submerging the wound in a bath containing the statin composition. In another example, the statin composition may be topically administered to the wound in the liquid format including irrigating the wound with the statin composition. In another example, the statin composition is topically administered to the wound in the liquid format including spraying the wound with the statin composition solution.

In one example, the statin composition may be topically administered onto the wound in the powder format. In another example, the statin composition may be topically administered to the wound in the ointment format. The statin composition may include contents of a ground oral tablet of the selected statin.

In various embodiments, the antimicrobial composition may be topically administered to the wound in a powder format, liquid format, or emulsion format comprising an ointment, cream, or lotion. In one example, the antimicrobial component comprises a quinolone; an azole selected from clotrimazole, ketoconazole, itraconazole, voriconazole, or combination thereof; an aminoglycoside selected from tobramycin, gentamycin, streptomycin, or combination thereof; a tetracycline; a macrolide; a lincosamide, a penicillin/cephalosporin; vancomycin; sulfamethoxazole; colistimethate; nitrofurantoin; oxazolidinone; trimethoprim; amphotericin; or combination thereof.

In one example, the antimicrobial composition is topically administered to the wound in a powder format. In another formulation, the antimicrobial composition is topically administered to the wound in a liquid format including spraying the antimicrobial composition onto the wound, submerging the wound in the antimicrobial composition, or irrigating the wound with the antimicrobial composition. In another formulation, the antimicrobial composition is topical administered to the wound in an emulsion format including an ointment, cream, or lotion. In one example, the antimicrobial composition comprises a mupirocin 2% ointment.

In one embodiment, topically co-administering the statin component and the antimicrobial component comprises topically administering the statin composition and the antimicrobial composition to the wound within about a 4-hour period or within about a 30-minute period.

In still yet another aspect, a method of treating a wound includes topically administering a wound treatment composition to the wound. The wound treatment composition may be administered in an ointment, liquid, or powder format and include an antimicrobial component and a statin component. The statin component may comprise a statin selected from atorvastatin, fluvastatin, lovastatin, pitavastatin, pravastatin, rosuvastatin, simvastatin, or combination thereof.

In one example, atorvastatin may be present in an amount between about 10 mg and about 80 mg; fluvastatin may present in an amount between about 20 mg and about 80 mg; lovastatin may be present in an amount between about 10 and about 60 mg; pitavastatin may be present in an amount between about 1 mg and about 4 mg; pravastatin may be present in an amount between about 10 mg and about 80 mg; rosuvastatin may be present in an amount between about 5 mg and about 40 mg; or the simvastatin may be present in an amount between about 5 mg and about 80 mg. In a further example, the wound treatment composition comprises contents of a ground oral tablet of the selected statin and the antimicrobial component comprises a quinolone; an azole selected from clotrimazole, ketoconazole, itraconazole, voriconazole, or combination thereof; an aminoglycoside selected from tobramycin, gentamycin, streptomycin, or combination thereof; a tetracycline; a macrolide; a lincosamide, a penicillin/cephalosporin; vancomycin; sulfamethoxazole; colistimethate; nitrofurantoin; oxazolidinone; trimethoprim; amphotericin; or combination thereof.

In another aspect, a method of treating a wound includes co-administering to the wound within a 24-hour period collagenase and a statin component comprising a statin. Co-administering may include topically administering a statin composition comprising the statin component and topically administering a collagenase composition comprising the collagenase. The statin may be selected from atorvastatin, fluvastatin, lovastatin, pitavastatin, pravastatin, rosuvastatin, simvastatin, or combination thereof. The statin composition may be administered in an ointment, liquid, or powder format.

In one embodiment, atorvastatin may be present in an amount between about 10 mg and about 80 mg; fluvastatin may present in an amount between about 20 mg and about 80 mg; lovastatin may be present in an amount between about 10 and about 60 mg; pitavastatin may be present in an amount between about 1 mg and about 4 mg; pravastatin may be present in an amount between about 10 mg and about 80 mg; rosuvastatin may be present in an amount between about 5 mg and about 40 mg; or the simvastatin may be present in an amount between about 5 mg and about 80 mg.

DESCRIPTION

In various embodiments, a topical treatment includes a topical statin component comprising one or more statins and an additional active component comprising one or more additional active drugs such as antimicrobial or collagenase. The active drugs identified herein may include pharmaceutically acceptable salts and derivatives of the identified active drugs.

The topical treatment may comprise one or more topical compositions comprising the statin component and additional active component for co-administration. For example, the topical treatment may include a topical composition containing all or a portion of the statin component in a powder, ointment, spray solution, irrigation solution, or footbath solution format. A solution may include dissolved, suspended, or dispersed solute. The composition may comprise a contained or encapsulated powder, premix composition, or a composition for administration, any of which may be provided in a single or multidose format. One or more base components may be included in the composition as a contained powder, premix composition, or composition for administration. The topical composition containing statin component may include all or a portion of additional active component or the additional active component may be present in a separate topical composition, which may be provided in a powder, cream, lotion, ointment, irrigation/bath solution, emulsion o/w or w/o, gel, or paste format, for example.

In some examples, the statin component may be provided in one or more capsules that may be opened, broken down, or dissolved and combined with a base component, which may include multiple base components, to formulate a composition prior to administration. The one or more capsules may include all or a portion of the additional active component comprising one or more additional active drugs or one or more additional active drugs may be combined with the base component separate of the satin powder to formulate a second topical composition, which, in some embodiments, may include a commercially available medicated topical composition including all or a portion of the additional active component. The one or more capsules may include one or more other base components in powder format for addition to the base component. The one or more capsules may comprise a dosage strength of the statin component for compounding with the base component to formulate a suitable dosage volume of the statin component comprising the desired dosage strength. Thus, in some embodiments, the statin component may be provided in a concentrated format comprising a powder. The powder may be encapsulated or contained in single or multidose amounts. For example, contents of a capsule may be added to one or more base components to formulate a single or multidose composition. In one embodiment, a base component may comprise a medicated composition comprising all or a portion of the additional active component and may be combined in an amount to provide a dosage strength of the additional active component. In various embodiments, the additional active component may include additional active drugs selected from antimicrobials, NSAIDs, steroids, local anesthetics, steroids, antihistamines, collagenase, or combinations thereof. In some embodiments, other categories of active drugs may be used. One or more additional active drugs may be present in powder encapsulated with or separate from the one or more statins. In some embodiments, one or more additional active drugs of the additional active component may comprise a solution, emulsion, cream, ointment, gel, or lotion format for addition to the one or more statin powder and/or base component.

In one embodiment, the topical treatment comprises a first topical composition comprising the statin component and a separate second topical composition comprising the additional active component for co-administered.

In some embodiments, the statin component is provided in a concentrated premix format comprising all or a portion of the active component including the one or more statins in a powder, emulsion, ointment, or liquid base component for further mixing with one or more additional base components to formulate a topical composition for administration. The concentrated premix may be provided in single or multidose volumes. In some embodiments, the premix may also include all or a portion of the additional active component including one or more additional active drugs selected from antimicrobials, collagenase, NSAIDs, steroids, local anesthetics, steroids, antihistamines, or combinations thereof. One or more of the additional active drugs may be provided in a powder encapsulated with or separate from the one or more statins. In some embodiments, one or more additional active drugs may be provided in a solution, emulsion, cream, ointment, gel, paste, powder, or lotion format for addition to the one or more statin powder and/or base component. The premix may be formulated for further mixing with additional base component to formulate a powder, gel, ointment, or liquid format for topical administration.

In some embodiments, the topical treatment includes a composition comprising the statin component and a base component, which may include multiple base components, in a powder, gel, ointment, or liquid format for topical administration. The composition may be provided in single or multidose volume. In some embodiments, the statin composition may include all or a portion of the additional active component comprising one or more additional active drugs selected from antimicrobials, collagenase, NSAIDs, steroids, local anesthetics, steroids, antihistamines, or combinations thereof.

As noted above, some embodiments include a first composition comprising all or a portion of the statin component and a separate second composition including all or a portion of the additional active component for co-administration. However, it will be appreciated that either the first and/or the second composition may further include a portion of the statin or additional active component. More than two compositions for co-administration may also be used. Some example first compositions may be devoid of additional active component or may include a portion of the additional active component for administration in addition to the second composition. The first composition may be administered coincident with the second composition, preferably within 10 minutes, 30 minutes, 1 hour, 4 hours, 8 hours, 12 hours, or at least within 24 hours. In some examples, the co-administration takes place prior to drying or absorbance of the co-administered composition at the body surface. The statin component may include one or more statins. In various embodiments, the statin component comprises one or more statins selected from atorvastatin, fluvastatin, lovastatin, pitavastatin, pravastatin, rosuvastatin, simvastatin, or combinations thereof. Some embodiments may include or be formulated from bulk pharmaceutical grade statin powder.

In one embodiment, the topical treatment comprises or is formulated from statin powder, ground oral statin tablets, or both.

Atorvastatin is a synthetic lipid-lowering agent. Atorvastatin is an inhibitor of 3-hydroxy-3-methylglutaryl-coenzyme A (HMG-CoA) reductase. This enzyme catalyzes the conversion of HMG-CoA to mevalonate, an early and rate-limiting step in cholesterol biosynthesis.

In various embodiments, the statin component comprises atorvastatin. Atorvastatin is available in bulk pharmaceutical grade powder. Some embodiments may alternatively or additionally include commercially available atorvastatin oral tablets ground to a fine powder. For example, the topical treatment may comprise a composition including ground atorvastatin oral tablets alone or combined with a base comprising a powder, solution, cream, lotion, ointment, gel, or paste. All or a portion of the additional active component may be mixed with the atorvastatin. An additional or second composition containing all or a remaining portion of the additional active component may be co-administered with the composition containing atorvastatin. Atorvastatin oral tablets are available in 10 mg, 20 mg, 40 mg, and 80 mg tablets. Other strength tablets may be used as they become available. Example inactive ingredients may include calcium carbonate, croscarmellose sodium, hydroxypropyl cellulose, lactose monohydrate, magnesium stearate, microcrystalline cellulose, Opadry White YS-1-7040 (hypromellose, polyethylene glycol, talc, titanium dioxide), polysorbate 80, or variants thereof. In some tablets, inactive ingredients may include basic butylated methacrylate copolymer, crospovidone, hydroxy propyl cellulose, lactose monohydrate, magnesium stearate, methanol, microcrystalline cellulose, sodium bicarbonate, sodium lauryl sulfate, lecithin, polyvinyl alcohol, talc, titanium dioxide, xanthan gum, or variants thereof.

The statin component may include atorvastin at a dosage strength between about 10 mg and about 80 mg. Thus, an administration volume of a dose of the statin component may comprise between about 10 mg and about 80 mg atorvastin. Similarly, a topical treatment comprising encapsulated statin component powder for mixing with one or more base components to formulate a premix or administration composition comprising a single dose may comprise between about 10 mg and about 80 mg atorvastin. Additionally, a topical treatment comprising a powder, ointment, emulsion, or liquid premix composition including one or more base components for further combining with one or more additional base components may comprise between about 10 mg and about 80 mg atorvastin in a single dose volume. Some embodiments may include atorvastin dosage amounts between about 10 mg and 70 mg, about 10 mg and about 50 mg, about 10 mg and about 30 mg, about 10 mg and about 20 mg, about 20 mg and about 80 mg, about 20 mg and about 60 mg, about 20 mg and about 40 mg, about 30 mg and about 80 mg, about 30 mg and about 60 mg, about 30 mg and about 40 mg, about 40 mg and about 80 mg, about 40 mg and about 60 mg, about 50 mg and about 80 mg, about 50 mg and about 60 mg, about 60 mg and about 80 mg, about 70 mg and about 80 mg, such as greater than about 10 mg, about 20 mg, about 30 mg, about 40 mg, about 50 mg, about 60 mg, or about 70 mg. In various embodiments, the statin component includes atorvastin dosage amounts of about 10 mg, about 20 mg, about 30 mg, about 40 mg, about 50 mg, about 60 mg, about 70 mg, or about 80 mg. As noted above, some embodiments may include multiple dosages from which multiple dosages may be formulated and/or administered.

In various embodiments, the statin component comprises fluvastatin. Fluvastatin is a cholesterol lowering agent that inhibits 3-hydroxy-3-methylglutaryl coenzyme A (HMG-CoA) reductase. Fluvastatin is available in bulk pharmaceutical grade powder. Some embodiments may alternatively or additionally include commercially available fluvastatin oral capsules or tablets ground to a fine powder. For example, the topical treatment may comprise a composition including ground fluvastatin oral tablets alone or combined with a base comprising a powder, solution, cream, lotion, ointment, gel, or paste. All or a portion of the additional active component may be mixed with the fluvastatin. An additional or second composition containing all or a remaining portion of the additional active component may be co-administered with the composition containing fluvastatin. Fluvastatin oral tablets are available in 80 mg extended release tablets, capsules are available in 20 mg and 40 mg. Other strengths may be used as they become available. Fluvastatin 80 mg tablets may include extended release tablets that may include inactive ingredients such as microcrystalline cellulose, hydroxypropyl methylcellulose, potassium bicarbonate, povidone, colloidal silicon dioxide, corn starch, hydroxypropyl cellulose, hypromellose, lecithin, magnesium stearate, polyethylene glycol, polyvinyl alcohol, iron oxide, sodium lauryl sulfate, talc, titanium dioxide, or variants thereof.

The statin component may include fluvastatin at a dosage strength between about 20 mg and about 80 mg. Thus, an administration volume of a dose of the statin component may comprise between about 20 mg and about 80 mg fluvastatin. Similarly, a topical treatment comprising encapsulated statin component powder for mixing with one or more base components to formulate a premix or administration composition comprising a single dose may comprise between about 20 mg and about 80 mg fluvastatin. Additionally, a topical treatment comprising a powder, ointment, emulsion, or liquid premix composition including one or more base components for further combining with one or more additional base components may comprise between about 20 mg and about 80 mg fluvastatin in a single dose volume. Some embodiments may include fluvastatin dosage amounts between about 20 mg and about 70 mg, about 20 mg and about 60 mg, about 20 mg and about 50 mg, about 20 mg and about 30 mg, about 30 mg and about 80 mg, about 30 mg and about 60 mg, about 30 mg and about 40 mg, about 40 mg and about 80 mg, about 40 mg and about 60 mg, about 50 mg and about 80 mg, about 50 mg and about 60 mg, about 60 mg and about 80 mg, about 70 mg and about 80 mg, such as greater than about 20 mg, about 30 mg, about 40 mg, about 50 mg, about 60 mg, or about 70 mg. In various embodiments, the statin component includes fluvastatin dosage amounts of about 20 mg, about 30 mg, about 40 mg, about 50 mg, about 60 mg, about 70 mg, or about 80 mg. As noted above, some embodiments may include multiple dosages from which multiple doses may be formulated and/or administered.

In various embodiments, the statin component comprises lovastatin. Lovastatin is a cholesterol lowering agent isolated from a strain of *Aspergillus terreus*. After oral ingestion, lovastatin, which is an inactive lactone, is hydrolyzed to the corresponding β-hydroxyacid form. This is a principal metabolite and an inhibitor of 3-hydroxy-3-methylglutaryl-coenzyme A (HMG-CoA) reductase. This enzyme catalyzes the conversion of HMG-CoA to mevalonate, which is an early and rate limiting step in the biosynthesis of cholesterol.

Lovastatin is available in bulk pharmaceutical grade powder. Some embodiments may alternatively or additionally include commercially available lovastatin oral tablets ground to a fine powder. For example, the topical treatment may comprise a composition including ground lovastatin oral tablets alone or combined with a base comprising a powder, solution, cream, lotion, ointment, gel, or paste. All or a portion of the additional active component may be mixed with the lovastatin. An additional or second composition containing all or a remaining portion of the additional active component may be co-administered with the composition containing lovastatin. Lovastatin oral tablets are available in 10 mg, 20 mg, and 40 mg tablets. Other strength tablets may be used as they become available. Example inactive ingredients may include lactose anhydrous, lactose monohydrate, magnesium stearate, microcrystalline cellulose, poloxamer, pregelatinized starch, sodium starch glycolate, butylated hydroxyanisole, talc, or variants thereof. Tablets may also contain pigment blend light orange, FD&C Blue #2 Aluminum Lake, Lake blend green, FD&C Yellow #6 Aluminum Lake, FD&C Blue #1 Aluminum Lake, D&C Yellow #10 Aluminum Lake.

The statin component may include lovastatin at a dosage strength between 10 mg and about 60 mg. Thus, an administration volume of a dose of the statin component may comprise between about 10 mg and about 60 mg lovastatin. Similarly, a topical treatment comprising encapsulated statin component powder for mixing with one or more base components to formulate a premix or administration composition comprising a single dose may comprise between about 10 mg and about 60 mg lovastatin. Additionally, a topical treatment composition comprising a powder, ointment, emulsion, or liquid premix composition including one or more base components for further combining with one or more additional base components may comprise between about 10 mg and about 60 mg lovastatin in a single dose volume. Some embodiments may include lovastatin dosage amounts between about 10 mg and about 50 mg, about 10 mg and about 40 mg, about 10 mg and about 30 mg, about 10 mg and about 20 mg, about 20 mg and about 60 mg, about 20 mg and about 50 mg, about 20 mg and about 40 mg, about 20 mg and about 30 mg, about 30 mg and about 60 mg, about 30 mg and about 40 mg, about 40 mg and about 60 mg, about 40 mg and about 50 mg, about 50 mg and about 60 mg, such as greater than about 10 mg, about 20 mg, about 30 mg, about 40 mg, or about 50 mg. In various embodiments, the statin component includes lovastatin dosage amounts of about 10 mg, about 20 mg, about 30 mg, about 40 mg, about 50 mg, or about 60 mg. As noted above, some embodiments may include multiple dosages from which multiple dosages may be formulated and/or administered. In various embodiments, the statin component comprises pitavastatin. Pitavastatin is a synthetic lipid-lowering agent. Pitavastatin is an inhibitor of 3-hydroxy-3-methylglutaryl-coenzyme A (HMG-CoA) reductase. Pitavastatin is available in bulk pharmaceutical grade powder. Some embodiments may alternatively or additionally include commercially available pitavastatin calcium or pitavastatin magnesium oral tablets ground to a fine powder. For example, the topical treatment may comprise a composition including ground pitavastatin oral tablets alone or combined with a base comprising a powder, solution, cream, lotion, ointment, gel, or paste. All or a portion of the additional active component may be mixed with the pitavastatin. An additional or second composition containing all or a remaining portion of the additional active component may be co-administered with the composition containing pitavastatin. Pitavastatin calcium and pitavastatin magnesium oral tablets are available in 1 mg, 2 mg, and 4 mg strength pitavastatin tablets. Other strength tablets may be used as they become available. Example inactive ingredients contained in pitavastatin calcium tablets include calcium carbonate, hypromellose, lactose monohydrate, crospovidone, low substituted hydroxypropylcellulose, hypromellose, magnesium aluminometasilicate, magnesium stearate, sodium carbonate anhydrous, or variants thereof, and a film coating containing hypromellose, titanium dioxide, polyethylene glycol, talc, triethyl citrate, colloidal anhydrous silica, or variants thereof.

The statin component may include pitavastatin at a dosage strength between 1 mg and about 4 mg. Thus, an administration volume of a dose of the statin component may comprise between about 1 mg and about 4 mg pitavastatin. Similarly, a topical treatment comprising encapsulated statin component powder for mixing with one or more base components to formulate a premix or administration composition comprising a single dose may comprise between about 1 mg and about 4 mg pitavastatin. Additionally, a topical treatment comprising a powder, ointment, emulsion, or liquid premix composition including one or more base components for further combining with one or more additional base components may comprise between about 1 mg and about 4 mg pitavastatin in a single dose volume. Some embodiments may include pitavastatin dosage amounts between about 1.5 mg and 4 mg, about 1.5 mg and about 3.5 mg, about 1.5 mg and about 3 mg, about 1.5 mg and about 2.5 mg, about 1.5 mg and about 2 mg, about 2 mg and about 4 mg, about 2 mg and about 3.5 mg, about 2 mg and about 3 mg, about 2 mg and about 2.5 mg, about 3 mg and about 4 mg, about 3 mg and about 3.5 mg, about 4.5 mg and about 4 mg, such as greater than about 1 mg, about 1.5 mg, about 2 mg, about 2.5 mg, about 3 mg, about 3.5 mg, or about 4 mg. In various embodiments, the statin component includes pitavastatin dosage amounts of about 1 mg, about 1.5 mg, about 2 mg, about 2.5 mg, about 3 mg, about 3.5 mg, or about 4 mg. As noted above, some embodiments may include multiple dosages from which multiple dosages may be formulated and/or administered.

In various embodiments, the statin component comprises pravastatin. Pravastatin is one of a class of lipid-lowering compounds, the statins, which reduce cholesterol biosynthesis. These agents are competitive inhibitors of HMG-CoA reductase, the enzyme catalyzing the early rate-limiting step in cholesterol biosynthesis, conversion of HMG-CoA to mevalonate.

Pravastatin is available in bulk pharmaceutical grade powder. Some embodiments may alternatively or additionally include commercially available pravastatin sodium oral tablets ground to a fine powder. For example, the topical treatment may comprise a composition including ground pravastatin oral tablets alone or combined with a base comprising a powder, solution, cream, lotion, ointment, gel, or paste. All or a portion of the additional active component may be mixed with the pravastatin. An additional or second composition containing all or a remaining portion of the additional active component may be co-administered with the composition containing pravastatin. Pravastatin sodium oral tablets are available in 10 mg, 20 mg, 40 mg, and 80 mg strength pravastatin tablets. Other strength tablets may be used as they become available. Example inactive ingredients may include croscarmellose sodium, lactose monohydrate, crospovidone, magnesium oxide, sodium stearyl fumarate, magnesium stearate, microcrystalline cellulose, povidone, polyoxyl 35 castor oil, or variants thereof. Additional inactive ingredients may include ferric oxide red, ferric oxide yellow, D&C yellow No. 10 aluminum lake, FD&C blue No. 1 aluminum lake, Opadry white YS-1-7040, or others.

The statin component may include pravastatin at a dosage strength between 10 mg and about 80 mg. Thus, an administration volume of a dose of the statin component may comprise between about 10 mg and about 80 mg pravastatin. Similarly, a topical treatment comprising encapsulated statin component powder for mixing with one or more base components to formulate a premix or administration composition comprising a single dose may comprise between about 10 mg and about 80 mg pravastatin. Additionally, a topical treatment comprising a powder, ointment, emulsion, or liquid premix composition including one or more base components for further combining with one or more additional base components may comprise between about 10 mg and about 80 mg pravastatin in a single dose volume. Some embodiments may include pravastatin dosage amounts between about 10 mg and 70 mg, about 10 mg and about 50 mg, about 10 mg and about 30 mg, about 10 mg and about 20 mg, about 20 mg and about 80 mg, about 20 mg and about 60 mg, about 20 mg and about 40 mg, about 30 mg and about 80 mg, about 30 mg and about 60 mg, about 30 mg and about 40 mg, about 40 mg and about 80 mg, about 40 mg and about 60 mg, about 50 mg and about 80 mg, about 50 mg and about 60 mg, about 60 mg and about 80 mg, about 70 mg and about 80 mg, such as greater than about 10 mg, about 20 mg, about 30 mg, about 40 mg, about 50 mg, about 60 mg, or about 70 mg. In various embodiments, the statin component includes pravastatin dosage amounts of about 10 mg, about 20 mg, about 30 mg, about 40 mg, about 50 mg, about 60 mg, about 70 mg, or about 80 mg. As noted above, some embodiments may include multiple dosages from which multiple dosages may be formulated and/or administered.

In various embodiments, the statin component comprises rosuvastatin. Rosuvastatin is one of a class of lipid-lowering compounds, the statins, which reduce cholesterol biosynthesis. These agents are competitive inhibitors of HMG-CoA reductase, the enzyme catalyzing the early rate-limiting step in cholesterol biosynthesis, conversion of HMG-CoA to mevalonate.

Rosuvastatin is available in bulk pharmaceutical grade powder. Some embodiments may alternatively or additionally include commercially available rosuvastatin sodium oral tablets ground to a fine powder. For example, the topical treatment may comprise a composition including ground rosuvastatin oral tablets alone or combined with a base comprising a powder, solution, cream, lotion, ointment, gel, or paste. All or a portion of the additional active component may be mixed with the rosuvastatin. An additional or second composition containing all or a remaining portion of the additional active component may be co-administered with the composition containing rosuvastatin. Rosuvastatin sodium oral tablets are available in 5 mg, 10 mg, 20 mg, and 40 mg strength rosuvastatin tablets. Other strength tablets may be used as they become available. Example inactive ingredients may include microcrystalline cellulose, lactose monohydrate, tribasic calcium phosphate, polydextrose, polyethylene glycol, crospovidone, magnesium stearate, hypromellose, triacetin, titanium dioxide, or variants thereof. Additional inactive ingredients may include ferric oxide red, ferric oxide yellow, FD&C yellow No. 5 tartrazine aluminum lake, FD&C yellow No. 6 sunset yellow FCF aluminum lake, FD&C Blue No. 2 Aluminum Lake, FD&C Yellow No. 6 Aluminum Lake, or others.

The statin component may include rosuvastatin at a dosage strength between 5 mg and about 40 mg. Thus, an administration volume of a dose of the statin component may comprise between about 5 mg and about 40 mg rosuvastatin. Similarly, a topical treatment comprising encapsulated statin component powder for mixing with one or more base components to formulate a premix or administration composition comprising a single dose may comprise between about 5 mg and about 40 mg rosuvastatin. Additionally, a statin composition comprising a powder, ointment, emulsion, or liquid premix composition including one or more base components for further combining with one or more additional base components may comprise between about 5 mg and about 40 mg rosuvastatin in a single dose volume. Some embodiments may include rosuvastatin dosage amounts between about 5 mg and about 35 mg, about 5 mg and about 30 mg, about 5 mg and about 25 mg, about 5 mg and about 20 mg, about 5 mg and about 15 mg, about 5 mg and about 10 mg, about 10 mg and about 40 mg, about 10 mg and about 30 mg, about 10 mg and about 25 mg, about 10 mg and about 20 mg, about 20 mg and about 40 mg, about 20 mg and about 35 mg, about 20 mg and about 30 mg, about 20 mg and about 25 mg, about 30 mg and about 40 mg, about 30 mg and about 35 mg, about 35 mg and about 40 mg, such as greater than about 5 mg, about 10 mg, about 15 mg, about 25 mg, about 30 mg, or about 35 mg. In various embodiments, the statin component includes rosuvastatin dosage amounts of about 5 mg, about 10 mg, about 15 mg, about 25 mg, about 30 mg, or about 35 mg. As noted above, some embodiments may include multiple dosages from which multiple dosages may be formulated and/or administered.

In various embodiments, the statin component comprises simvastatin. Simvastatin is a lipid-lowering agent that is derived synthetically from a fermentation product of *Aspergillus terreus*. After oral ingestion, simvastatin, which is an inactive lactone, is hydrolyzed to the corresponding β-hydroxyacid form. This is an inhibitor of 3-hydroxy-3-methylglutaryl-coenzyme A (HMG-CoA) reductase. This enzyme catalyzes the conversion of HMG-CoA to mevalonate, which is an early and rate-limiting step in the biosynthesis of cholesterol.

Simstatin is available in bulk pharmaceutical grade powder. Some embodiments may alternatively or additionally include commercially available simvastatin tablets for oral administration. For example, the topical treatment may comprise a composition including ground simvastatin oral tablets alone or combined with a base comprising a powder, solution, cream, lotion, ointment, gel, or paste. All or a portion of the additional active component may be mixed with the simvastatin. An additional or second composition containing all or a remaining portion of the additional active component may be co-administered with the composition containing simvastatin. Simvastatin tablets are available in 5 mg, 10 mg, 20 mg, 40 mg or 80 mg strengths. Other strengths may be used as they come available. Example inactive ingredients include microcrystalline cellulose, hydroxypropyl cellulose, hypromellose E5, croscarmellose sodium, ferric oxide red, lactose monohydrate, magnesium stearate, maize starch, talc, titanium dioxide, butylated hydroxyanisole, ascorbic acid, citric acid monohydrate, triethyl citrate, and variants thereof. Additional inactive ingredients may include ferric oxide red, ferric oxide yellow, or others.

The statin component may include simvastatin at a dosage strength between 5 mg and about 80 mg. Thus, an administration volume of a dose of the statin component may comprise between about 5 mg and about 80 mg simvastatin. Similarly, a topical treatment comprising encapsulated statin component powder for mixing with one or more base components to formulate a premix or administration composition comprising a single dose may comprise between about 5 mg and about 80 mg simvastatin. Additionally, a topical treatment comprising a powder, ointment, emulsion, or liquid premix composition including one or more base components for further combining with one or more additional base components may comprise between about 5 mg and about 80 mg simvastatin in a single dose volume. Some embodiments may include simvastatin dosage amounts between about 5 mg and 75 mg, about 5 mg and about 60 mg, about 5 mg and about 45 mg, about 5 mg and about 35 mg, about 5 mg and about 20 mg, about 5 mg and about 10 mg, about 10 mg and 80 mg, about 10 mg and about 70 mg, about 10 mg and about 50 mg, about 10 mg and about 30 mg, about 10 mg and about 20 mg, about 20 mg and about 80 mg, about 20 mg and about 60 mg, about 20 mg and about 40 mg, about 30 mg and about 80 mg, about 30 mg and about 60 mg, about 30 mg and about 40 mg, about 40 mg and about 80 mg, about 40 mg and about 60 mg, about 50 mg and about 80 mg, about 50 mg and about 60 mg, about 60 mg and about 80 mg, about 70 mg and about 80 mg, such as greater than about 5 mg, about 10 mg, about 20 mg, about 30 mg, about 40 mg, about 50 mg, about 60 mg, or about 70 mg. In various embodiments, the statin component includes simvastatin dosage amounts of about 5 mg, about 10 mg, about 20 mg, about 30 mg, about 40 mg, about 50 mg, about 60 mg, about 70 mg, or about 80 mg. As noted above, some embodiments may include multiple dosages from which multiple dosages may be formulated and/or administered.

As introduced above, in some embodiments, the additional active component comprises one or more additional active drugs. In some examples, the one or more additional active drugs include an antimicrobial agent comprising one or more antimicrobial drugs.

In one example, the topical treatment comprises antimicrobial agent powder mixed with statin powder. In another example, the topical treatment comprises antimicrobial agent powder in a separate capsule or container for further compounding with the statin powder and/or one or more base components to formulate a compounded premix or administration composition. In some embodiments, all or a portion of the antimicrobial agent is provided in a separate second composition comprising a solution, lotion, paste, cream, ointment, emulsion, or gel for co-administration as described herein. Thus, various embodiments of the examples and embodiments of the compositions described above and elsewhere herein comprising one or more statins may further comprise one or more antimicrobial drugs or may be provided in separate compositions for co-administration with an additional composition comprising one or more antimicrobial drugs. Example antimicrobial drugs include antibacterial drugs, antifungal drugs, and viral drugs, or combinations thereof.

In various embodiments, the topical treatment comprises an additional active component including an antimicrobial agent comprising one or more antifungal drugs alone or in combination with one or more antibacterial drugs and/or one or more antiviral drugs wherein the one or more antifungal drugs are selected from one or more categories of antifungal drugs including azoles (imidazoles), antimetabolites, allylamines, morpholine, glucan synthesis inhibitors (echinocandins), polyenes; other antifungal/onychomycosis agents, and new classes of antifungal/onychomycosis agents. For example, the antifungal drug may comprise one or more antifungals selected from abafungin, albaconazole, amorolfine, amphotericin b, anidulafungin, bifonazole, butenafine, butoconazole, candicidin, caspofungin, ciclopirox, clotrimazole, econazole, fenticonazole, filipin, fluconazole, flucytosine, griseofulvin, haloprogin, hamycin, isavuconazole, isoconazole, itraconazole, ketoconazole, micafungin, miconazole, naftifine, natamycin, nystatin, omoconazole, oxiconazole, polygodial, posaconazole, ravuconazole, rimocidin, sertaconazole, sulconazole, terbinafine, terconazole, tioconazole, tolnaftate, undecylenic acid, voriconazole, or a combination thereof. In some embodiments, an antifungal drug selected from one or more azoles. In one embodiment, the antifungal drug is selected from itraconazole, voriconazole, or combination thereof. In one embodiment, the antimicrobial agent comprises an antifungal drug selected from one or more antifungals comprising fluconazole, itraconazole, voriconazole, amphotericin, nystatin, clotrimazole, econazole, or ketoconazole.

In various embodiments, the additional active component includes an antimicrobial agent comprising one or more antibacterial drugs alone or in combination with one or more antifungal drugs and/or one or more antiviral drugs. In some embodiments, the antibacterial drug comprises one or more enicillins, cephalosporins, fluoroquinolones, aminoglycosides, monobactams, carbapenems, macrolides, other antibacterial, or combination thereof. For example, the antibacterial drug may include one or more antibacterials selected from afenide, amikacin, amoxicillin, ampicillin, arsphenamine, azithromycin, azlocillin, aztreonam, bacampicillin, bacitracin, carbacephem (loracarbef), carbenicillin, cefaclor, cefadroxil, cefalotin, cefamandole, cefazolin, cefdinir, cefditoren, cefepime, cefixime, cefoperazone, cefotaxime, cefoxitin, cefpodoxime, cefprozil, ceftazidime, ceftibuten, ceftizoxime, ceftobiprole, ceftriaxone, cefuroxime, cephalexin, chloramphenicol, chlorhexidine, ciprofloxacin, clarithromycin, clavulanic acid, clindamycin, cloxacillin, colimycin, colistimethate teicoplanin, colistin, demeclocycline, dicloxacillin, dirithromycin, doripenem, doxycycline, efprozil, enoxacin, ertapenem, erythromycin, ethambutol, flucloxacillin, fosfomycin, furazolidone, gatifloxacin, geldanamycin, gentamicin, grepafloxacin, herbimycin, imipenem, isoniazid, kanamycin, levofloxacin, lincomycin, linezolid, lomefloxacin, meropenem, meticillin, meticillin, mezlocillin, minocycline, mitomycin, moxifloxacin, mupirocin, nafcillin, neomycin, netilmicin, nitrofurantoin, norfloxacin, ofloxacin, oxacillin, oxytetracycline, paromomycin, penicillin G, penicillin V, piperacillin, pivmecillinam, platensimycin, polymyxin B, prontosil, pvampicillin, pyrazinamide, quinupristin/dalfopristin, rifampicin, rifampin, roxithromycin, sparfloxacin, spectinomycin, spiramycin, sulbactam, sulfacetamide, sulfamethizole, sulfamethoxazole, sulfanilimide, sulfisoxazole, sulphonamides, sultamicillin, telithromycin, tetracycline, thiamphenicol, ticarcillin, tobramycin, trimethoprim, trimethoprim-sulfamethoxazole, troleandomycin, trovafloxacin, or a combination thereof. In some embodiments, the antibacterial drug is selected from mupirocin, gentamycin, tobramycin, or combinations thereof. In one embodiment, the antibacterial drug includes an aminoglycoside.

In various embodiments, the antimicrobial agent comprises an antibacterial drug selected from one or more antibacterials comprising vancomycin, ciprofloxacin, levofloxacin, azithromycin, clindamycin, doxycycline, mupirocin, ceftriaxone, colistimethate, tobramycin, cefepime, gentamicin, streptomycin, sulfamethoxazole/trimethoprim. In one example, the topical composition comprises linezolid, levofloxacin, ciprofloxacin, or combination thereof.

In one embodiment, the additional active component comprises collagenase. In one example, the topical treatment comprises collagenase powder mixed with statin powder. In another example, the topical treatment comprises collagenase powder in a separate capsule or container for further compounding with statin powder and/or one or more base components to formulate a compounded premix or administration composition. In some embodiments, all or a portion of the collagenase is provided in a separate second composition comprising a solution, lotion, paste, cream, ointment, emulsion, or gel for co-administration as described herein. Thus, various embodiments of the examples and embodiments of the compositions described above and elsewhere herein comprising one or more statins may further comprise collagenase or may be provided in separate compositions for co-administration with an additional composition comprising collagenase.

In various embodiments, the topical treatment comprises a capsule comprising one or more statin powders as described herein. Additional powders may also be included, such as antimicrobial drug powder, collagenase powder, base component powder, and/or others described herein. In one example, the encapsulated powder may be formulated for topical administration to a wound, and thus may comprise a composition for administration. In another example, the encapsulated powder may be formulated for addition to one or more base components to formulate a compounded premix composition or a composition for administration. Co-administration compositions may comprise the same or different formats. One or more co-administration compositions may be provided as encapsulated powders, administration compositions, or premix compositions, for example. In some embodiments, co-administration compositions include a statin component containing composition described herein and an additional active component containing composition described herein, such as antimicrobial or collagenase containing composition. The compositions may comprise encapsulated powder, ground tablets, solution, ointment, lotion, cream, paste, or gel, for example. One or more of the compositions may be provided as premix compositions or administration compositions. The compositions may be combined or co-administered separately.

In various embodiments, the additional active component comprises a commercially available medicated composition including all or a portion of the additional active component. For example, the medicated composition may be co-administered with a statin containing composition or statin may be compounded with the medicated composition.

In various embodiments, a base component may comprise one or more carriers, diluents, solubilizers, stabilizers (which may include antioxidants), buffers, tonicity modifiers, bulking agents, viscosity modifiers (enhancers/reducers), surfactants, chelating agents, adjuvants, dispersants, humectants, preservatives, binders, colorants, or combinations thereof.

Diluents may include aqueous or non-aqueous diluents such as water, saline solution, or sodium hypochlorite, or powders such as lactose, talc, dusting powder, starch, aluminum silicate, hydrous magnesium silicate, zinc oxide, or combinations thereof, for example. Solubilizers may include alcohols, water, DMSO, or other suitable agents, for example. Viscosity modifiers may include carbopol, poloxamer, xanthan gum, methylcellulose, carboxymethyl cellulose, hydroxyethyl cellulose, ethylcellulose, gelatin, magnesium aluminum silicate, polyvinyl alcohol, sodium alginate, or combinations thereof, for example. Humectants may include glycerin, lecithin, propylene glycol, or combinations thereof, for example. Chelating agents may include EDTA or others, for example. Dispersants may include xylitol, poloxamers, or combinations thereof, for example.

In various embodiments, the statin composition comprises a base component including xylitol, poloxamers, or both, which may be included in a compounded capsule or premix or separate of statin powder. For example, xylitol, poloxamers, or both may comprise a powder mixed with the statin powder in a capsule or may be in a separate capsule or container that may be further compounded with base component in a compounded premix or administration composition. In one embodiment, the statin composition includes LoxaSperse™ distributed by PCCA, 9901 South Wilcrest Drive, Houston, TX 77099, which includes a blend of micronized xylitol and poloxamers.

In one example, a base component comprises a powder carrier or diluent. A powder carrier or diluent may include lactose, talc, dusting powder, starch, aluminum silicate, hydrous magnesium silicate, zinc oxide, or combinations thereof, for example. Ointment carriers may include petrolatum, mineral oil, lanolin, silicones, dimethicone, or zinc oxide, for example.

In various embodiments, one or more base components may be utilized alone or in combination to formulate a statin composition comprising a format other than powder, e.g., solution, suspension, gel, ointment, cream, lotion, or paste.

As noted above, a base component may comprise a carrier, which may comprise a diluent. The topical treatment may include a base component including a carrier and/or may be formulated for further compounding or mixing with a base component comprising a carrier to formulate a composition comprising an administration composition.

In one aspect, the statin component comprises an encapsulated powder for mixing with a powder base to formulate a composition for topical administration to a wound. In a further example, the statin component comprises an encapsulated powder composition for mixing with a base component comprising an ointment carrier to formulate another composition comprising an ointment for topical administration to a wound. In still another example, the statin component comprises an encapsulated powder for mixing with a base component comprising a liquid carrier to formulate another composition comprising a liquid composition for topical administration to a wound in a spray, bath, or irrigation. The encapsulated powder may comprise one or more statin oral tablets ground to a fine powder. The encapsulated powder may comprise a fine powder of bulk statin powder. Either encapsulated fine powder may comprise an administration composition or may be combined with a base component prior to administration as described herein. For example, a base powder, solution, or ointment may be added to an encapsulated fine powder comprising ground tablets, wherein the added base is in addition to the oral tablet inactive ingredients. In one example, encapsulated powder includes xylitol, poloxamer, or both, such as LoxaSperse™. In various embodiments, an above composition may further include an additional active component described herein or may be co-administered with another composition comprising the additional active component. For example, an above composition may be co-administered with a second composition comprising an antimicrobial, collagenase, or other active drug. In one example, the second composition comprises a powder, ointment, solution, paste, gel, lotion, or cream. In a further example, the second composition comprises a commercially available medicated composition comprising all or a portion of the additional active component. In one embodiment, the statin containing composition may be combined with the second composition prior to administration.

In some embodiments, a statin component containing composition includes or is formulated for combining with a base component comprising an ointment carrier. For example, an ointment carrier may comprise hydrophilic petrolatum, white petrolatum, hydrophilic ointment, white ointment, anhydrous lanolin, hydrous lanolin, PEG ointment, or combinations thereof. In some formulations ointment carriers may include water soluble/miscible, emulsion (o/w or w/o), absorption, or oleaginous ointment carriers. Soluble/miscible ointment carriers may include water soluble/miscible PEG ointments, for example. Emulsion carriers may include hydrophilic ointments, cold cream, vanishing cream, or hydrous lanolin, for example. Oleaginous bases may include hydrocarbons, white petrolatum, or white ointment. Absorption carriers may include anhydrous lanolin, for example.

In various embodiments, one or more base components comprise lecithin, phospholipids, glycols, paraffin, fatty acids, carbopols/carbomers, alcohols, lanolin, or combination thereof, for example. In one embodiment, a base component includes a carrier comprising a sodium chloride 0.09% solution (sterile). Some embodiments may include base components include polyethylene glycol (PEG), while other embodiments may be PEG-free. In an above embodiment or another embodiment, a base component may include a carrier including a silicon or silicon variant or may be silicon-free. A base component comprising a carrier solution may comprise aqueous or non-aqueous liquids. Example solutions may include water, alcohol, DMSO, saline or sodium chloride, sodium hypochlorite, or hydrogen peroxide. In some embodiments, the carrier comprises an aqueous solution such as a saline solution. For example, the statin component may comprise or be formulated for combining with a base component comprising a sodium hydroxide solution carrier, which may be a sterile solution, an alcohol, water, e.g., purified water, water for irrigation, water for injection, or a sterile water. The carrier may be water soluble/miscible or formulated for water absorption, such as a gel.

In some embodiments, a statin component containing composition of the disclosed topical treatment includes or is formulated for combining with a base component comprising a water-in-oil emulsion or oil-in-water emulsion carrier. For example, the carrier may comprise an emulsion having a cream or lotion format including one or more of acrylate copolymers, alcohol, camphor, carbomer, dimethyl isosorbide, disodium EDTA, dl-alphatocopheryl acetate, edetate disodium, emulsifying wax, eucalyptus oil, flavonoids, glycerin, glycol dicaprylate/dicaprate, hydroxyethyl cellulose, isopropyl myristate, lactic acid, meadowsweet extract, menthol, mineral oil, neopentyl, phenolic glycosides, polyethylene glycol (PEG), polysorbate (e.g., polysorbate 85, polysorbate 20), purified water, titanium dioxide, tridecyl stearate, tridecyl trimellitate, sodium hydroxide, sodium hydroxide, sorbitol, stearic acid, zinc pyrithione, or combinations thereof.

In some embodiments, a statin component containing composition of the herein described topical treatment includes or is formulated for combining with a base component comprising a gel carrier. Example gel carriers may be an aqueous or non-aqueous gel. The gel may include thickening agents and/or gelling agents such as carbopol, poloxamer, xanthan gum, methylcellulose, carboxymethyl cellulose, hydroxyethyl cellulose, ethylcellulose, gelatin, magnesium aluminum silicate, polyvinyl alcohol, sodium alginate, or combinations thereof.

Further to the above, in some embodiments, a base component includes a commercially available base carrier for compounding. The base carrier may be liquid, semi-liquid, or solid. For example, the base carrier may include an aqueous, organic, or inorganic solution, which may include a dispersion or suspension, cream, gel, ointment, lotion, emulsion, powder, or paste. Thus, a method of formulating a composition according to the herein described topical treatment may include addition of one or more statins, e.g., pharmaceutical bulk powders and/or ground tablets, to a topical base carrier for compounding to formulate creams, ointments, solutions/irrigations/baths, powders, gels, lotions, or pastes, for example. Non-limiting examples may include Spira-Wash® Gel, Lipoderm®, Loxasperse®, Mucolox™, or Versabase® Cream, Goam, Gel, Lotion or Shampoo, manufactured and distributed by PCCA, 9901 South Wilcrest Drive, Houston, TX 77099.

As introduced above and described further below, a statin component containing composition of the herein described topical treatment may include an active component comprising one or more statins and a base component formulated as a premix for further mixing with additional base component, which may be or include a carrier vehicle and may comprise a diluent, to formulate a composition for administration or may itself comprise a composition for administration. Thus, the statin component containing composition may comprise an administration dosage form comprising one or more statins and one or more base components for topical administration to a wound in a powder, ointment, or liquid format.

In some embodiments, the compound composition comprises a premix including one or more statins and a base component having a powder, ointment, or liquid format for further mixing with one or more additional base components such as a carrier, which may include a diluent, powder, liquid, or ointment. For example, a second base component comprising carrier and/or diluent may be further combined with the premix to formulate a composition for topical administration. In other examples, the composition comprises one or more statins compounded with a base component formulated for administration to a wound without additional compounding, e.g., without mixing with additional base component. As described above and elsewhere herein, the topical treatment may include an active component comprising one or more additional active drugs and/or one or more base components that may be included in an encapsulated or otherwise contained powder including one or more statins, which in some examples may comprise a premix. In some embodiments, one or more of the powders may be provided separate for further compounding or direct administration. In various embodiments, the powders may be encapsulated and/or otherwise contained, e.g., a vial, packet, or pouch. The stain powder may comprise bulk powder and/or ground oral tablets. Additional active drugs may similarly comprise bulk powder and/or ground oral tablets. For example, an antimicrobial agent may comprise one or more antimicrobial drugs comprising bulk powder and/or ground oral tablets comprising antimicrobial drug. Additionally or alternatively, the additional active component may comprise collagenase power, cream, ointment, or other format. The all or a portion of the additional active component may be co-administered in a separate composition as described herein or, in some embodiments, may be combined with the statin component to formulate an administration composition.

In one embodiment, the topical treatment may comprise a powder format including one or more statins, which in some embodiments may include a powder carrier base component, for mixing with a base component comprising a liquid carrier, which may comprise a diluent, to formulate an administration composition comprising a liquid, which may include a solution, dispersion, or suspension, for topical administration to a wound in a spray, bath, or irrigation. In one embodiment, the powder comprises a compounded administration formulation for administration to the wound without further mixing with the liquid carrier base component. As described above and elsewhere herein additional active drugs and/or base components may be included in a contained or encapsulated powder, premix, or may be combined therewith to formulate the composition for administration. The powder may be encapsulated or otherwise contained, e.g., a vial, packet, or pouch. Stain powder may be obtained from bulk powder and/or ground oral tablets. Additional active drugs may similarly comprise bulk powder and/or ground oral tablets. For example, an antimicrobial agent may comprise one or more antimicrobial drugs comprising bulk powder and/or ground oral tablets comprising antimicrobial drug. Additionally or alternatively, the additional active component may comprise collagenase power, cream, ointment, or other format. The all or a portion of the additional active component may be co-administered in a separate composition as described herein or, in some embodiments, may be combined with the statin component to formulate an administration composition.

In another embodiment, the topical treatment may comprise a powder format including one or more statins, which in some embodiments may include one or more base component powders, for mixing with a base component comprising a powder carrier, which may comprise a diluent, to formulate an administration formulation comprising a powder format for topical administration to a wound. In one embodiment, the powder format comprises a compounded administration formulation for administration to the wound without further mixing. As described above and elsewhere herein additional active drugs and/or base components may be included in a contained or encapsulated powder, premix, or may be combined therewith to formulate the composition for administration. The powder may be encapsulated or otherwise contained, e.g., a vial, packet, or pouch. Stain powder may be obtained from bulk powder and/or ground oral tablets. Additional active drugs may similarly comprise bulk powder and/or ground oral tablets. For example, an antimicrobial agent may comprise one or more antimicrobial drugs comprising bulk powder and/or ground oral tablets comprising antimicrobial drug. Additionally or alternatively, the additional active component may comprise collagenase power, cream, ointment, or other format. The all or a portion of the additional active component may be co-administered in a separate composition as described herein or, in some embodiments, may be combined with the statin component to formulate an administration composition.

In another embodiment, the topical treatment may comprise a powder format including one or more statins, which in some embodiments may include one or more base component powders, for mixing with a base component comprising an ointment carrier, which may comprise a diluent, to formulate an administration formulation comprising an ointment format for topical administration to a wound. In one embodiment, the powder format comprises a compounded administration formulation for administration to the wound without further mixing. As described above and elsewhere herein additional active drugs and/or base components may be included in a contained or encapsulated powder, premix, or may be combined therewith to formulate the composition for administration. The powder may be encapsulated or otherwise contained, e.g., a vial, packet, or pouch. Stain powder may be obtained from bulk powder and/or ground oral tablets. Additional active drugs may similarly comprise bulk powder and/or ground oral tablets. For example, an antimicrobial agent may comprise one or more antimicrobial drugs comprising bulk powder and/or ground oral tablets comprising antimicrobial drug. Additionally or alternatively, the additional active component may comprise collagenase power, cream, ointment, or other format. The all or a portion of the additional active component may be co-administered in a separate composition as described herein or, in some embodiments, may be combined with the statin component to formulate an administration composition.

In another embodiment, the topical treatment comprises an ointment format, which may include an ointment base component, for mixing with a base component comprising liquid carrier, which may comprise a diluent, to formulate an administration formulation comprising a liquid or emulsion for topical administration to a wound in a spray, bath, or irrigation. In one embodiment, the ointment format comprises a compounded administration formulation for administration to the wound without further mixing. As described above and elsewhere herein additional active drugs and/or base components may be included in the ointment premix or may be combined therewith to formulate the composition for administration. The ointment may be formulated by combing statin powder with an ointment base component wherein the stain powder is obtained from bulk powder and/or ground oral tablets. Additional active drugs may similarly comprise bulk powder and/or ground oral tablets. For example, an antimicrobial agent may comprise one or more antimicrobial drugs comprising bulk powder and/or ground oral tablets comprising antimicrobial drug. Additionally or alternatively, the additional active component may comprise collagenase power, cream, ointment, or other format. The all or a portion of the additional active component may be co-administered in a separate composition as described herein or, in some embodiments, may be combined with the statin component to formulate an administration composition.

In another embodiment, the topical treatment comprises a liquid format, which may include a liquid base component, for mixing with a base component comprising a powder or ointment carrier, which may comprise a diluent, to formulate an administration formulation comprising a solution, suspension, or emulsion for topical administration to a wound in a spray, bath, or irrigation. In one embodiment, the liquid format comprises a compounded administration formulation for administration to the wound without further mixing. As described above and elsewhere herein additional active drugs and/or base components may be included in the liquid premix or may be combined therewith to formulate the composition for administration. The liquid may be formulated by combing statin powder with an ointment base component wherein the stain powder is obtained from bulk powder and/or ground oral tablets. Additional active drugs may similarly comprise bulk powder and/or ground oral tablets. For example, an antimicrobial agent may comprise one or more antimicrobial drugs comprising bulk powder and/or ground oral tablets comprising antimicrobial drug. Additionally or alternatively, the additional active component may comprise collagenase power, cream, ointment, or other format. The all or a portion of the additional active component may be co-administered in a separate composition as described herein or, in some embodiments, may be combined with the statin component to formulate an administration composition.

As introduced above, the statin component comprises one or more statins. For example, the statin component may comprise atorvastatin at a dosage strength between about 10 mg and about 80 mg, such as any amount or range described herein. In another example, the statin component comprises fluvastatin at a dosage strength between about 20 mg and about 80 mg, such as any amount or range described herein. In another example, the statin component comprises lovastatin at a dosage strength between about 10 and about 60 mg, such as any amount or range described herein. In another example, the statin component comprises pitavastatin at a dosage strength between about 1 mg and about 4 mg, such as any amount or range described herein. In another example, the statin component comprises pravastatin at a dosage strength between about 10 mg and about 80 mg, such as any amount or range described herein. In another example, the statin component comprises rosuvastatin at a dosage strength between about 5 mg and about 40 mg, such as any amount or range described herein. In another example, the statin component comprises simvastatin at a dosage strength between about 5 mg and about 80 mg, such as any amount or range described herein. Some embodiments may include multiple statins. For example, the statin component may comprise atorvastatin at a dosage strength between about 5 mg and about 60 mg and one or more of pravastatin at a dosage strength between about 5 mg and about 60 mg, fluvastatin at a dosage strength between about 10 mg and about 60 mg, or rosuvastatin at a dosage strength between about 5 mg and about 30 mg. In another example, the statin component comprises lovastatin at a dosage strength between about 5 mg and about 40 mg and one or more of atorvastatin at a dosage strength between about 5 mg and about 60 mg, simvastatin at a dosage strength between about 10 mg and about 60 mg, or fluvastatin at a dosage strength between about 10 mg and about 60 mg. In another example, the statin component comprises pitavastatin at a dosage strength between about 0.5 mg and about 3 mg and one or more of atorvastatin at a dosage strength between about 5 mg and about 60 mg, pravastatin at a dosage strength between about 5 mg and about 60 mg, or fluvastatin at a dosage strength between about 10 mg and about 60 mg. In another example, the statin component comprises simvastatin at a dosage strength between about 10 mg and about 60 mg and one or more of atorvastatin at a dosage strength between about 5 mg and about 60 mg, rosuvastatin at a dosage strength between about 5 mg and about 30 mg, or fluvastatin at a dosage strength between about 10 mg and about 60 mg. In another example, the statin component comprises pravastatin at a dosage strength between about 5 mg and about 60 mg and one or more of fluvastatin at a dosage strength between about 10 mg and about 60 mg, simvastatin at a dosage strength between about 10 mg and about 60 mg, or rosuvastatin at a dosage strength between about 5 mg and about 30 mg. In another example, the statin component comprises or rosuvastatin at a dosage strength between about 5 mg and about 30 mg and one or more of fluvastatin at a dosage strength between about 10 mg and about 60 mg, lovastatin at a dosage strength between about 5 mg and about 40 mg, or pitavastatin at a dosage strength between about 0.5 mg and about 3 mg. In another example, the statin component comprises or fluvastatin at a dosage strength between about 10 mg and about 60 mg and one or more of lovastatin at a dosage strength between about 5 mg and about 40 mg or pitavastatin at a dosage strength between about 0.5 mg and about 3 mg. In another example, the statin component comprises pitavastatin at a dosage strength between about 0.5 mg and about 3 mg and one or more of lovastatin at a dosage strength between about 5 mg and about 40 mg or simvastatin at a dosage strength between about 10 mg and about 60 mg. In another example, the statin component comprises lovastatin at a dosage strength between about 5 mg and about 40 mg and one or more of pitavastatin at a dosage strength between about 0.5 mg and about 3 mg, rosuvastatin at a dosage strength between about 5 mg and about 30 mg, or pitavastatin at a dosage strength between about 0.5 mg and about 3 mg.

Various embodiments of the topical treatment include a statin component, such as an above example statin component, and an additional active component either together in a combination composition or co-administered in one or more separate compositions. In one example, the additional active component comprises collagenase. The collagenase may be provided in an ointment, solution, powder, cream, lotion, gel, or paste format. In one application, the collagenase is provided in a commercially available medicated composition such as collagenase ointment marketed under the name Santyl™ by Smith & Nephew, Inc., Fort Worth, T 76109 including white petroleum. The statin component may be combined with the collagenase ointment to formulate an administration composition or may be co-administered separately. For example, the statin component may be administered to a body surface in a solution (e.g., footbath, irrigation), ointment, or powder before or after co-administration of the collagenase ointment to the same body surface. In an above or another example, the additional active component comprises one or more antimicrobial drugs, such as those described herein. For example, an embodiment of each of the above example statin components may be combined with or co-administered with one or more antifungal drugs selected from amphotericin b, ciclopirox, clotrimazole, econazole, fluconazole, itraconazole, ketoconazole, miconazole, nystatin, oxiconazole, tolnaftate, voriconazole, or a combination thereof. In another example, an embodiment of each of the above example statin components may be combined with or co-administered with one or more antibacterial drugs selected from vancomycin, ciprofloxacin, levofloxacin, azithromycin, clindamycin, doxycycline, mupirocin, ceftriaxone, colistimethate, tobramycin, cefepime, gentamicin, streptomycin, sulfamethoxazole/trimethoprim. In another example, one or more antifungal drugs selected from fluconazole, itraconazole, voriconazole, amphotericin, nystatin, clotrimazole, teconazole, ketoconazole, or combination thereof and one or more antibacterial drugs are selected from vancomycin, ciprofloxacin, levofloxacin, azithromycin, clindamycin, doxycycline, mupirocin, ceftriaxone, colistimethate, tobramycin, cefepime, gentamicin, streptomycin, sulfamethoxazole/trimethoprim, or combination thereof. Example, dosage amounts of antifungal drugs and antibacterial drugs may be between 0.5 mg and 1.5 g. For example, dosage amounts tobramycin in an amount between about 10 mg and about 1.2 g, colistimethate in an amount between about 50 g and about 300 g, voriconazole in an amount between about 50 mg and about 500 mg, clotrimazole in an amount between about 10 mg and about 150 mg, ceftriaxone in an amount between about 100 mg and about 1 g, gentamycin in an amount between about 10 mg and about 200 mg, levofloxacin in an amount between about 100 mg and about 1 g, or mupirocin in an amount between about 5 mg and about 100 mg. Some embodiments may include higher or lower dosage amounts for the above antimicrobial drugs.

An embodiment of each of the above examples may comprise a base component including xylitol, poloxamers, or both. In one example, the statin composition includes LoxaSperse™.

An embodiment of each of the above examples may include a base component comprising an ointment, liquid, or powder carrier as described herein for topical administration in an ointment, spray, bath, irrigation, or powder.

In various embodiments, a method of compounding may comprise addition of an active component comprising the one or more statin powders to a base component wherein the base component comprises one or more base components including a liquid, semi-liquid, or solid carrier. For example, the base component may include an aqueous, organic, or inorganic solution, which may include a dispersion or suspension, cream, gel, ointment, lotion, emulsion, powder, or paste.

A method of compounding a composition including the statin component may comprise encapsulating one or more statins powders. In one example, all or a portion of the one or more statins that are encapsulated comprise ground oral statin tablets. In a further example, the method may include grinding one or more oral tablets comprising a statin prior to encapsulating the resulting powder. In some embodiments, the method may also include encapsulating one or more antimicrobial powders as described herein together with or separate of all or a portion of the powder including the one or more statins. For example, the method may include encapsulating antifungal and/or antibacterial powder with the statin powder or in a separate capsule. Capsules may include single or multiple dosages for combining with one or more base components. In one embodiment, capsules include a base component powder and the contents of the capsule may be applied directly to a wound or may be further combined with additional base component, which may be same or different from the encapsulated portion of the base component, prior to topical administration to a wound. In one embodiment, the method may include enclosing the powder in other containers in addition to or instead of capsules. For example, all or some of the powder may be enclosed in a packet, vial, or pouch. In one embodiment, all or a portion of the statin component is provided in a first composition formulated and is co-administered with a second composition comprising all or a portion of the additional active component. In one example, the first composition comprises a powder, solution, or ointment and the second composition comprises a commercially available medicated composition. In one example, the additional active component comprises one or more antimicrobial drug, collagenase, or a combination thereof.

In an above or another method, compounding a composition including statin component comprises combining the encapsulated or contained powder comprising the one or more statins with a base component to formulate a statin composition for topical administration to a wound or a premix for further mixing with another or additional base component. For example, a capsule may be opened, broken, or dissolved to release the contained powder. In embodiments wherein one or more additional active and/or base components, such as antimicrobials, xylitol, poloxamers, or combinations thereof, are not encapsulated or may be contained separately from the one or more statins, the method may further include addition of such ingredients. One or more additional ingredients may also be included in a premix or may be added prior to, during, or after further addition of additional base component to the premix. In one instance, one or more additional actives or base components may comprise a format other than powder, e.g., solution, suspension, gel, ointment, cream, lotion, or paste. In some embodiments, premix composition may comprise a powder, solution, suspension, gel, ointment, cream, lotion, or paste format suitable for further mixing with base component to formulate a composition for topical administration to a wound in an ointment, powder, liquid spray, bath, or irrigation. One or more additional ingredients may be included in the premix or may be added prior to, during, or after further addition of base component to the premix. In one embodiment, all or a portion of the statin component is provided in a first composition formulated from the premix and that is co-administered with a second composition comprising all or a portion of the additional active component. In one example, the first composition comprises a powder, solution, or ointment and the second composition comprises a commercially available medicated composition. In one example, the additional active component comprises one or more antimicrobial drug, collagenase, or a combination thereof.

In one embodiment, a method of compounding a composition including statin component comprises combining one or more oral statin tablets and a base component to formulate a composition for topical administration or a premix for further mixing with another or additional base. The oral statin tablets may be ground to a fine powder and added to the base component may comprise a powder, liquid, emulsion, or ointment carrier/diluent, for example. In some embodiments, the powder may be dissolved in a solvent, suspended in solution, or wetted with a base component prior to combining with all or a portion of a remainder of base component. Solvent, suspending, or wetting agents may include alcohols, water, DMSO, or other suitable agents. In embodiments including additional ingredients, such as antimicrobials and/or base components comprising xylitol, poloxamers, or combinations thereof, the method may include further combining such ingredients with the remainder of the active component and base component. One or more of the additional ingredients may comprise a format other than powder, e.g., solution, suspension, gel, ointment, cream, lotion, or paste. Compositions comprising a premix may comprise a powder, solution, suspension, gel, ointment, cream, lotion, or paste format suitable for further mixing with base to formulate a composition for topical administration to a wound in an ointment, powder, liquid spray, bath, or irrigation. One or more additional ingredients, such as actives or a base component, may be included in the premix or may be added prior to, during, or after further addition of base component to the premix. In one embodiment, all or a portion of the statin component is provided in a first composition formulated from the premix and that is co-administered with a second composition comprising all or a portion of the additional active component. In one example, the first composition comprises a powder, solution, or ointment and the second composition comprises a commercially available medicated composition. In one example, the additional active component comprises one or more antimicrobial drug, collagenase, or a combination thereof.

An encapsulated composition may include one or more statin powders together with one or more base components and/or additional active drugs. For example, the topical treatment may comprise a composition including one or more statin powders and a base component wherein the base component comprises xylitol and/or poloxamer powder. In one example, the encapsulated powder includes one or more additional powder actives drugs instead of or in addition to the xylitol and/or poloxamer powder. For example, the encapsulated powder may include collagenase or one or more antimicrobial drugs, such as one or more antifungal drugs, antibacterial drugs, antiviral drugs, or combinations thereof. The encapsulated powder may be applied directly to a wound or may be combined with one or more additional base components, such as a carrier/diluent, prior to administration. In one embodiment, all or a portion of the encapsulated statin component comprises a first composition that is co-administered with a second composition comprising all or a portion of the additional active component. In one example, the first composition comprises a powder, solution, or ointment and the second composition comprises a commercially available medicated composition. In one example, the additional active component comprises one or more antimicrobial drug, collagenase, or a combination thereof.

A premix may include one or more statin powders combined with and/or for further combination with, which may include additional, base component. In another or further example, the premix may include all or a portion of the additional active component. For example, the premix may be further mixed with additional active drugs or base component prior to administration. In one example, a premix includes statin powders dissolved, dispersed, or suspended in a base component comprising an ointment, emulsion, or solution carrier. In another or further embodiment, the premix may include collagenase or one or more antimicrobial drugs, such as one or more antifungal drugs, antibacterial drugs, antiviral drugs, or combinations thereof or may be co-administered with a second composition including all or a portion of the additional active component. The premix may be combined with one or more additional base components, such as a carrier/diluent, prior to administration. In one embodiments, the premix may contain xylitol and/or poloxamer. In another embodiment, xylitol and/or poloxamer may be added to the premix prior to administration.

In various embodiments, a method of compounding a composition comprising the statin component comprises compounding a premix as described above and elsewhere herein for addition to a base component, which may typically comprise a carrier/diluent, to formulate a composition comprising an ointment, powder, or liquid for topical administration to a wound in an ointment, powder, liquid spray, bath, or irrigation. Formulating the such a composition may include combining one or more statins and one or more base components as described herein. Additional active ingredients such as collagenase or an antimicrobial agent may also be added. In some embodiments, some or all the statin and/or additional active ingredients may include pure powder formats, powder from ground oral tablets, or both. Combining may include adding all or a portion of the powder to be combined with all or a portion of base component and mixing. In some embodiments, all or a portion of the powder may be dispersed, suspended, or dissolved in a liquid to form a paste, solution, dispersion, or suspension prior to addition to the base. In one of an above or another embodiment, all or a portion of the powder may be directly added to all or a portion of base component. According to various embodiments, base component may comprise a suitable base to formulate a premix composition comprising a format selected from a cream, gel, lotion, ointment, emulsion (oil-in-water or water-in-oil), foam, solution, dispersion, or powder, for example, suitable for topical application. Base component may be present in a premix formulation in an amount sufficient to obtain a desired amount of active drugs per unit weight or volume when further mixed with additional base component, which may be a same or different base component composition. The one or more active drugs may be mixed dispersed, suspended, solubilized, or dissolved with the base component. In some embodiments, base component may comprise suitable components to formulate a composition for topical administration comprising a format selected from a cream, gel, lotion, ointment, emulsion (oil-in-water or water-in-oil), foam, liquid, dispersion, or powder, for example, suitable for topical application that when mixed with the one or more statins, which may include a compounded premix, and additional ingredients formulates an ointment, powder, liquid spray, bath, or irrigation. In other embodiments, the composition for topical administration comprises another format such as an emulsion, cream, lotion, gel, or paste. Base component may be present in an amount sufficient to obtain the desired amount of active drugs per unit weight or volume or when further mixed with additional base component, which may be the same or different base component composition. The one or more active drugs of the active component may be mixed dispersed, suspended, solubilized, or dissolved in base component.

In some embodiments, the methods may include combining the active drugs with base component comprising a commercially available base vehicle composition for compounding. The base vehicle composition may be liquid, semi-liquid, or solid. For example, the base vehicle composition may include an aqueous, organic, or inorganic solution, which may include a dispersion or suspension, cream, gel, ointment, lotion, emulsion, powder, or paste. Thus, the method of formulating the composition may include addition of statin powder and/or ground oral statin tablets to a topical base vehicle for compounding to formulate a composition for administration, which may include co-administration, comprising a cream, ointment, solution, powder, gel, lotion, or paste, for example. In embodiments including antimicrobial agent, the method may also include addition of antimicrobial drug powder or ground oral tablets containing antimicrobial drug to a topical base for compounding. Non-limiting examples may include Spira-Wash® Gel, Lipoderm®, Loxasperse®, Mucolox™, or Versabase® Cream, Goam, Gel, Lotion or Shampoo, manufactured and distributed by PCCA, 9901 South Wilcrest Drive, Houston, TX 77099.

A method of treating a wound may comprise topically administering the topical treatment to the wound or adjacent tissue. The wound may include intact or broken skin or underlying tissue. The wound may include intact or broken mucosal tissue, such as of the eye, gingivae, vagina, or anus. In various embodiments, topical administration of the topical treatment may be used to treat a wound comprising a burn, cut, inflamed skin or mucosal tissue, ulcer, slow healing wound attendant to diabetes, post-surgical site healing, e.g., in oral cavity, bone implantation or grafting, posthemorrhoidectomy pain, dry eye, dry or scaly skin such as that related to ichthyosis or Sjogren-Larsson Syndrome, radiation induced skin toxicity, chemotherapy induced alopecia, chronic periodontitis, psoriasis, cutaneous plaque psoriasis, acne vulgaris, or combinations thereof.

In some embodiments, a method of treatment of a wound may comprise compounding and/or dispensing a capsule or container comprising one or more compositions of the topical treatment, which may comprise an encapsulated powder, premix, or composition for administration. In one embodiment, a method of treatment of a wound may comprise administering the topical treatment described herein.

In one example, the method of treating a wound comprises treating the wound with a wound ointment according to the topical treatment described herein. The wound ointment may be applied directly to wounded skin or tissues or adjacent thereto. In various applications, the applied wound ointment may be exposed or occluded.

In one example, the method of treating a wound comprises treating the wound with a wound powder according to the topical treatment described herein. The wound powder may be applied directly to wounded skin or tissues or adjacent thereto. In various embodiments, the applied wound powder may be exposed or occluded.

In one example, the topical treatment comprises a liquid spray for administering to a wound in a spray. The wound spray may comprise an aqueous or non-aqueous base component. In some examples, the base component may comprise an aqueous liquid comprising water, sodium chloride solution, hydrogen peroxide, or sodium hypochlorite. An encapsulated powder comprising one or more statins as described herein may be combined with the base prior to administration in a spray. The one or more statins and additional ingredients, when present, may be dispersed, suspended, solubilized, or dissolved in the base. In one example, a composition comprising a premix ointment may be added to a base to formulate a wound spray. The base may comprise an aqueous liquid comprising water, sodium chloride, hydrogen peroxide, or sodium hypochlorite. The wound spray may be sprayed onto wounded skin, tissue, or adjacent regions thereof.

Various embodiments comprising a liquid format may be administered in a footbath, which may include a hand bath or soak, for example, to treat a wound. The method may include adding the statin component to a footbath. The statin component added to the footbath may comprise a composition a described herein such as an encapsulated powder, one or more ground oral tablets, a premix, for example, wherein base component or additional base has been added before, during, or after the statin component is added to the footbath. In some embodiments, one or more ground statin tablets may be added to base component and mixed in the footbath or in a container for further addition to the footbath. A base component comprising a carrier including an aqueous diluent may in various embodiments be in addition to a base component already present. For example, a composition comprising statin component in a solution, cream, ointment, powder, gel, paste, or lotion format may be added to a footbath. Additional base component comprising a carrier/aqueous diluent may also be added. In some embodiments, prior to addition of the diluent the statin component comprises, a concentrated powder or premix, and following addition of the carrier/diluent, the resultant composition comprises the statin dosage amounts described herein. The footbath solution may be agitated and/or heated in some embodiments. A foot or a hand may contact the footbath solution in the footbath for administration of the composition. In another embodiment, the statin component may be added to a liquid base or may include a liquid base and be formulated for irrigation treatment of a wound. In some examples, irrigation treatments may include higher dosages of active drugs than identified above. For example, some topical treatment compositions for irrigation treatment may include two to three times higher dosage of active drug.

A "footbath" refers to a container that can hold some volume (e.g., about 1.0 liters to about 10 liters) of a footbath solution, which may typically be an aqueous solution or suspension, and is designed to physically accommodate at least a portion of one or both feet of a subject. A footbath administration includes administration of the topical composition utilizing a footbath. A footbath may be used as a hand bath; however, smaller bathing containers may typically be utilized as hand baths. In various embodiments, footbath solutions may be utilized as hand bath solutions. A footbath can comprise several features or agents that effect various functions. For example, a footbath can comprise one or more lights or light-emitting devices, a mechanical agitation agent (e.g., one or more jets or bubble makers) to physically agitate the enclosed water, a bubble agent to create bubbles within the enclosed water, a heating agent to heat the enclosed water, a vibration agent to vibrate the enclosed water (e.g., a high frequency vibration massage), an infrared device to provide infrared light to a foot or feet of the subject, a massage agent (e.g., a roller) that provides massaging contact to at least a portion of one or both feet, a pedicure agent that can clean or contact a foot or feet with a pumice, or a combination thereof. In an aspect, a footbath can have a waterfall element. In an aspect, an agitation agent or an agitator can be coupled to both a motor and the footbath. In an aspect, a footbath can comprise one or more splashguards and other spill-resistant features to ensure that the water remains enclosed within a container. A footbath may also accommodate a subject's calves, meaning that the container is "deep" so as to allow the enclosed water to contact both the feet and at least a portion of the calves of the subject. Several manufacturers market footbaths including PIBB, Dr. Scholl's, Kendal, Conair (e.g., Model FB5X, FB3, FB27R, FB30, FB52, etc.), and Brookstone.

In one embodiment, a topical treatment kit includes the statin component described herein or one or more components thereof. For example, a kit may include one or more oral tablets of one or more statins for grinding into a fine powder for topical administration consistent to that described herein. In one example, the kit includes a pill crusher for grinding the one or more oral tablets. In another example, a kit includes one or more statin powders from bulk powder encapsulated or otherwise contained. In a further example to an above example, the kit includes a base component. In an embodiment, the kit comprises a premix including the statin powder, bulk or ground oral statin tablets, in base component for further combining with additional or different base component. In another embodiment, the kit includes the base component and powder and/or oral tablets separate for further compounding prior to administration. In one example, the kit includes a footbath and encapsulated statin powder and/or one or more oral statin tablets. The kit may also include all or a portion of the additional active component comprising one or more additional active drugs. For example, the kit may include one or more additional active drugs selected from antimicrobials, collagenase, NSAIDs, steroids, local anesthetics, steroids, antihistamines, or combinations thereof. Other active drugs may also be included. One or more additional active drugs may comprise a bulk powder or ground oral tablet encapsulated with or separate from the one or more statins. In one embodiment, the kit includes one or more oral tablets comprising some or all the additional active component for grinding to a fine powder and combining with the base component and statin. In some embodiments, one or more additional active drugs may comprise a solution, emulsion, cream, ointment, gel, or lotion format for addition to the one or more statin powder and/or base component. Some embodiments may include the additional active component within a commercially available medicated composition, such as any of those described herein.

Various examples of additional active components are describe below, as well as else herein. Consistent with the present description, it will be appreciated that all or a portion of the additional active component may be provided in a composition for co-administration with another composition comprising some or all of the statin component. Further, any of the compositions may include all or a portion of the statin component and the additional active component. Thus, examples include statin component and additional active component provided in a single composition or compositions for co-administration and may include formats and be administered as described herein. Similarly, the components and compositions may comprise encapsulated powders, solutions, ointments, premixes, or compositions for administration, as also described herein. For example, a combination composition or one or more co-administration compositions may comprise a powder, cream, lotion, ointment, solution, emulsion (o/w, w/o), gel, or paste, for example. In an particular example topical treatment including the statin component and additional active component described herein, a powder, cream, lotion, ointment, solution, emulsion (o/w, w/o), gel, or paste composition including all or a portion of the additional active component is co-administered with a powder, ointment, or solution (e.g., spray, irrigation, bath) including all or a portion of the statin component.

In one example, the additional active component includes one or more antimicrobial drugs comprising a quinolone. Quinolones utilize a mechanism of action that includes inhibition of DNA replication and transcription. In various embodiments, the additional active component comprises one or more quinolone selected from one or more first generation quinolones such as nalidixic acid, oxolinic acid, cinoxacin, piromidic acid, pipemidic acid, or flumequine; one or more second generation quinolones such as ciprofloxacin, enoxacin, fleroxacin, levofloxacin, lomefloxacin, norfloxacin, ofloxacin, pefloxacin, rufloxacin; one or more third generation quinolones such as gatifloxacin, grepafloxacin, pazufloxacin, sparfloxacin, temafloxacin, or tosufloxacin; or one or more fourth generation quinolones such as clinafloxacin, gemifloxacin, moxifloxacin, sitafloxacin, or trovafloxacin; or combinations thereof. In one embodiment, the quinolone is selected from ciprofloxacin, levofloxacin, moxifloxacin, ofloxacin, or combination thereof. In one embodiment, the additional active component comprises ciprofloxacin, levofloxacin, or both. In an example, the additional active component comprises levofloxacin in a dosage amount between about 100 mg and about 1000 mg, such as about 125 mg, about 500 mg, or about 750 mg. In some arrangements, levofloxacin may be utilized from an encapsulated powder comprising bulk powder or ground tablet powder or solution, for example, together with statin component or separate for co-administration therewith as described herein, which may include further combining with base component.

In one example, the additional active component includes an antimicrobial drug comprising mupirocin. In one example, mupirocin is administered in a mupirocin ointment, such as a commercially available 2% mupirocin ointment; mupirocin cream, such as a commercially available 2% mupirocin cream; bulk powder; or ground oral tablet or ground powder thereof, together with all or a portion of the statin component or co-administered therewith as described here.

In one example, the additional active component includes an antimicrobial drug comprising vancomycin. In an example, vancomycin is provided in a dosage amount between about 10 mg and about 100 mg, such as about 100 mg, which may include an encapsulated powder, together with statin component or separate for co-administration therewith as described herein, which may include further combining with base component.

In one example, the additional active component includes an antimicrobial drug comprising one or more aminoglycosides, such as tobramycin, gentamycin, streptomycin, or combination thereof. Tobramycin may be particularly effective against gram-negative bacteria, including numerous *Pseudomonas* species as well as a certain gram-positive bacteria including *Staphylococcus aureus*. Gentamycin may be particularly effective against gram-positive bacteria, including MRSA, and gram-negative bacteria, including certain *Pseudomonas* species. Streptomycin may be particularly effective against gram-positive and gram-negative bacteria, including *E. coli, Enterococcus*, and *Proteus*. In an example, tobramycin may be provided as an encapsulated powder, solution, or otherwise. The encapsulated powder may comprise powder utilized from tobramycin powder for injection. The powders may be encapsulated in containers of other than capsules. The tobramycin may be present together with statin component or separate for co-administration therewith as described herein, which may include further combining with base component. In an example, streptomycin may be provided as an encapsulated bulk powder, a vial powder or solution (e.g., utilized from powder or solution for injection), or otherwise together with statin component or separate for co-administration therewith as described herein, which may include further combining with base component. In an example, gentamycin may be provided in a dosage amount between about 10 mg and about 150 mg, such as about 80 mg together with statin component or separate for co-administration therewith as described herein, which may include further combining with base component.

In one example, the additional active component includes an antimicrobial drug comprising one or more tetracyclines, such as doxycycline, tetracycline, or both. Tetracyclines inhibit bacterial protein biosynthesis by binding reversibly to the bacterial subunit 30 s of the bacterial ribosome thereby inhibiting translocation of peptidyl transfer RNA. In an example, tetracycline may be provided as an encapsulated powder bulk powder or otherwise in a dosage amount between about 100 mg and about 1000 mg, such as about 200 mg or about 500 mg, together with statin component or separate for co-administration therewith as described herein, which may include further combining with base component. In an example, doxycycline may be provided as an encapsulated powder bulk powder or otherwise in a dosage amount between about 10 mg and about 300 mg, such as about 100 mg or 200 mg, together with statin component or separate for co-administration therewith as described herein, which may include further combining with base component.

In one example, the additional active component includes an antimicrobial drug comprising one or more macrolides, such as azithromycin. Macroldies inhibit bacterial protein biosynthesis by binding reversibly to the bacterial subunit 50 s of the bacterial ribosome thereby inhibiting translocation of peptidyl transfer RNA. In an example, azithromycin may be provided as an encapsulated powder bulk powder or otherwise in a dosage amount between about 10 mg and about 300 mg, such as about 100 mg, together with statin component or separate for co-administration therewith as described herein, which may include further combining with base component.

In one example, the additional active component includes an antimicrobial drug comprising one or more lincosamides, such as clindamycin. Lincosamides inhibit bacterial protein biosynthesis by binding reversibly to the bacterial subunit 50 s of the bacterial ribosome thereby inhibiting translocation of peptidyl transfer RNA. In an example, the additional active component comprises clindamycin in a dosage amount between about 10 mg and about 500 mg, such as about 50 mg or about 300 mg. In some arrangements, clindamycin may be utilized from a bulk powder, ground tablet powder, or solution together with statin component or separate for co-administration therewith as described herein, which may include further combining with base component.

In one example, the additional active component includes an antimicrobial drug comprising one or more penicillins/cephalosporins, which inhibit formation of peptidoglycan cross-links in bacterial cell walls. Example, penicillins include piperacillin-tazobactam, ampicillin, or both. Example cephalosporins may include first generation cephalosporins, such as cephalexin, second-generation cephalosporins such as cefoxitin, third-generation cephalosporins such as ceftriaxone, fourth-generation cephalosporins such as cefepime, or combinations thereof.

In one example, the additional active component includes an antimicrobial drug comprising one or more polymyxins, which penetrate into and disrupt bacterial cell membranes. Example, polymyxins include colistimethate. In an example, the additional active component comprises colistimethate in a dosage amount between about 10 mg and about 250 mg, such as about 150 mg. In some arrangements, colistimethate may be utilized from a bulk powder, ground tablet powder, or solution together with statin component or separate for co-administration therewith as described herein, which may include further combining with base component.

In one example, the additional active component includes an antimicrobial drug comprising one or more sulfa-based subsets that act by inhibition of bacterial utilization of PABA (para-aminobenzoic acid) for the synthesis of folic acid, an important metabolite in DNA synthesis. One example is sulfamethoxazole.

In one example, the additional active component includes an antimicrobial drug comprising trimethoprim, which blocks the production of tetrahydrofolic acid from dihydrofolic acid by binding to and reversibly inhibiting the required enzyme, dihydrofolate reductase. In an example, the additional active agent includes sulfamethoxazole and trimethoprim provided as an encapsulated powder together with statin component or separate for co-administration therewith as described herein, which may include further combining with base component.

In one example, the additional active component includes an antimicrobial drug comprising one or more nitrofurans, such as nitrofurantoin, which inactivate or alter bacterial ribosomal proteins and other molecules.

In one example, the additional active component includes an antimicrobial drug comprising one or more oxazolidinone, such as linezolid, which bind to the bacterial 23S ribosomal RNA of the 50 s subunit and prevent formation of a functional 70 s initiation complex limiting bacterial production. In an example, the additional active component comprises linezolid in a dosage amount between about 10 mg and about 750 mg, such as about 300 mg or about 600 mg. In some arrangements, linezolid may be utilized from a bulk powder, oral tablet, or ground tablet powder, which may be encapsulated, together with statin component or separate for co-administration therewith as described herein, which may include further combining with base component.

In one example, the additional active component includes an antimicrobial drug comprising one or more nystatin, which binds sterols in the cell membrane of susceptible species resulting in the change in membrane permeability and the subsequent leakage of intracellular components.

In one example, the additional active component includes an antimicrobial drug comprising one or more azoles, which selectively inhibit fungal cytochrome P-450 sterile C-14 alpha-demethylation. In various embodiments, the additional active component comprises one or more azoles selected from clotrimazole, ketoconazole, itraconazole, voriconazole, or combination thereof. Some embodiments may utilize other or additional azoles. In an example, the additional active component comprises voriconazole in a dosage amount between about 10 mg and about 300 mg, such as about 200 mg. In some arrangements, voriconazole may be utilized from a bulk powder, oral tablet, ground tablet powder, or solution for injection together with statin component or separate for co-administration therewith as described herein, which may include further combining with base component. In an example, the additional active component comprises fluconazole in a dosage amount between about 10 mg and about 400 mg, such as about 200 mg, which may comprise an encapsulated bulk powder or ground oral tablet powder, together with statin component or separate for co-administration therewith as described herein, which may include further combining with base component. In an example, the additional active component comprises metronidazole in a dosage amount between about 10 mg and about 500 mg, such as about 375 mg, which may comprise an encapsulated powder, for example, together with statin component or separate for co-administration therewith as described herein, which may include further combining with base component. In an example, the additional active component comprises clotrimazole in a dosage amount between about 5 mg and about 50 mg, such as about 20 mg, which may comprise an encapsulated powder, for example, together with statin component or separate for co-administration therewith as described herein, which may include further combining with base component. In an example, the additional active component comprises itraconazole in a dosage amount between about 5 mg and about 80 mg, such as about 50 mg, which may comprise an encapsulated powder, for example, together with statin component or separate for co-administration therewith as described herein, which may include further combining with base component.

In one example, the additional active component includes an antimicrobial drug comprising amphotericin in a dosage amount between about 1 mg and about 75 mg, such about 10 mg or about 50 mg. Amphotericin binds to the sterol component of a cell membrane, leading to alterations in cell permeability and cell death. In an example, amphotericin may be provided as an encapsulated powder or solution (e.g., utilized from a solution for injection) together with statin component or separate for co-administration therewith as described herein, which may include further combining with base component.

In one example, the additional active component comprises acyclovir. In an example, acyclovir may be provided as an encapsulated powder or suspension together with statin component or separate for co-administration therewith as described herein, which may include further combining with base component.

In one example, the additional active component comprises a mucolytic, such as acetylcysteine in a dosage amount between about 50 mg and about 150 mg, such as about 100 mg. In an example, acetylcysteine may be provided as an encapsulated powder together with statin component or separate for co-administration therewith as described herein, which may include further combining with base component.

In one example, the additional active component comprises an antihistamine, such as azelastine in a dosage amount between about 50 mg and about 700 mg, such as about 500 mg. In an example, azelastine may be provided as an encapsulated powder together with statin component or separate for co-administration therewith as described herein, which may include further combining with base component.

In one example, the additional active component comprises urea in a dosage amount of between 50 mg and 1000 mg, such as about 500 mg, together with statin component or separate for co-administration therewith as described herein, which may include further combining with base component.

In one example, the additional active component comprises an NSAID, such as diclofenac, together with statin component or separate for co-administration therewith as described herein, which may include further combining with base component.

In one example, the additional active component comprises a local anesthetic, such as lidocaine, together with statin component or separate for co-administration therewith as described herein, which may include further combining with base component.

In one example, the additional active component comprises tobramycin, methylprednisolone, or both provided in a powder, cream, lotion, ointment, solution, emulsion (o/w, w/o), gel, or paste composition together with statin component or separate for co-administration therewith as described herein, which may include further combining with base component. The tobramycin may be administered in a dosage amount between about 50 mg and about 150 mg, such as about 90 mg, and the methylprednisolone may be administered in a dosage amount between about 1 mg and about 10 mg, such as about 5 mg.

Further example additional active components include (a) ciprofloxacin, mupirocin, betamethasone, and clotrimazole, (b) ciprofloxacin, betamethasone, and clotrimazole, (c) doxycycline and itraconazole (e.g., about 100 mg doxycycline and about 50 mg itraconazole), (d) doxycycline and mupirocin (e.g., about 200 mg doxycycline and about 30 mg mupirocin), (e) fluticasone (e.g., about 3 mg), (f) gentamycin, doxycycline, and mupirocin (e.g., about 160 mg gentamycin, about 100 mg doxycycline, and about 20 mg mupirocin), (g) gentamycin, mupirocin, betamethasone, and clotrimazole, (h) gentamycin, betamethasone, and clotrimazole (e.g., about 80 mg gentamycin, about 10 mg betamethasone, and about 10 mg clotrimazole), (i) gentamycin, mupirocin, and betamethasone, (j) gentamycin and methylprednisolone (e.g., about 90 mg gentamycin and about 5 mg methylprednisolone), (k) itraconazole and methylprednisolone (e.g., about 50 mg itraconazole and about 5 mg methylprednisolone), (l) levofloxacin, clindamycin, and itraconazole (e.g., about 50 mg levofloxacin, about 25 mg clindamycin, and about 25 mg itraconazole), (m) mupirocin, fluticasone, and itraconazole (e.g., about 100 mg mupirocin, about 3 mg fluticasone, and about 50 mg itraconazole), (n) mupirocin, betamethasone, and clotrimazole, (o) mupirocin, clindamycin, and itraconazole (e.g., about 20 mg mupirocin, about 25 mg clindamycin, and about 25 mg itraconazole), (p) mupirocin and methylprednisolone (e.g., about 20 mg mupirocin and about 5 mg methylprednisolone), (q) mupirocin and itraconazole (e.g., about 20 mg mupirocin and about 50 mg itraconazole), (r) tobramycin, doxycycline, mupirocin, and itraconazole (e.g., powder or ointment), (s) theophylline (e.g., about 100 mg), (t) tobramycin and fluticasone (e.g., about 100 mg tobramycin and about 1 mg fluticasone), (u) tobramycin and methylprednisolone (e.g., about 90 mg tobramycin and about 5 mg methylprednisolone), (v) diclofenac, lidocaine, and prilocaine (e.g., a cream), fluticasone, amitriptyline, and gabapentin (e.g., a cream), (w) diclofenac and lidocaine (e.g., a solution), (x) fluocinonide cream (e.g., 0.1% cream), (y) acetic acid and hydrocortisone, and (z) betamethasone. Still additional examples include one or more of budesonide, cefepime, ceftriaxone, clobetasol, fluocinolone, ipratropium, meropenem (e.g., between about 750 mg and about 1250 mg), nitrofurantoin (e.g., between about 10 mg and about 35 mg), paromomycin (e.g., between about 150 mg and about 300 mg), piperacillin-tazobactam, collagenase (e.g., collagenase ointment), or combinations thereof.

In any of the above examples, the statin component may comprise a statin in a dosage amount described herein. For example, the statin component may comprise atorvastatin in a dosage amount between about 10 mg and about 80 mg, fluvastatin in a dosage amount between about 20 mg and about 80 mg, lovastatin in a dosage amount between about 10 and about 60 mg, pitavastatin in a dosage amount between about 1 mg and about 4 mg, pravastatin in a dosage amount between about 10 mg and about 80 mg, rosuvastatin in a dosage amount between about 5 mg and about 40 mg, simvastatin in a dosage amount between about 5 mg and about 80 mg, or combination thereof.

In some embodiments, compositions described herein as being encapsulated may be otherwise contained such as in a vial or pouch. As also noted above, compositions described as being encapsulated may also include oral tablets that may be ground to a fine powder for addition to base component or administration.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification.

Various elements described herein have been described as alternatives or alternative combinations, e.g., in a lists of selectable actives, ingredients, or compositions. It is to be appreciated that embodiments may include one, more, or all of any such elements. Thus, this description includes embodiments of all such elements independently and embodiments including such elements in all combinations.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity.

Any numerical range recited herein includes all values and ranges from the lower value to the upper value. For example, if a weight range is stated as 1 mg to 50 mg, it is intended that values such as 2 mg to 40 mg, 10 mg to 30 mg, 1 mg to 3 mg, or 2 mg, 25 mg, 39 mg and the like, are expressly enumerated in this specification. These are only examples of what is specifically intended, and all possible combinations of numerical values and ranges between and including the lowest value and the highest value enumerated are to be considered to be expressly stated in this application. Numbers modified by the term "approximately" or "about" are intended to include +/−10% of the number modified.

The present disclosure may be embodied in other forms without departing from the spirit or essential attributes thereof and, accordingly, reference should be had to the following claims rather than the foregoing specification as indicating the scope of the invention. Further, the illustrations of arrangements described herein are intended to provide a general understanding of the various embodiments, and they are not intended to serve as a complete description. Many other arrangements will be apparent to those of skill in the art upon reviewing the above description. Other arrangements may be utilized and derived therefrom, such that logical substitutions and changes may be made without departing from the scope of this disclosure.

What is claimed is:

1. A method of treating a wound, the method comprising:
    topically co-administering to the wound within a 24 hour period collagenase and a statin, the co-administering comprising:
        locally treating the wound by topically administering a statin solution or suspension comprising hypromellose, lactose monohydrate, magnesium stearate, an aqueous liquid, and the statin, wherein the statin is selected from atorvastatin, pitavastatin, rosuvastatin, simvastatin, or combination thereof, wherein topically administering the statin solution or suspension comprises submerging the wound in the statin solution or suspension within a bath containing the statin solution or suspension, irrigating the wound with the statin solution or suspension, or spraying the wound with the statin solution or suspension; and
        topically administering a collagenase composition comprising the collagenase.

* * * * *